United States Patent
Shimada

(10) Patent No.: US 6,899,855 B2
(45) Date of Patent: May 31, 2005

(54) HYDROGEN-OCCLUSION ALLOY REGENERATING APPARATUS

(75) Inventor: Toshiaki Shimada, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 100 days.

(21) Appl. No.: 09/808,813

(22) Filed: Mar. 15, 2001

(65) Prior Publication Data

US 2002/0025461 A1 Feb. 28, 2002

(30) Foreign Application Priority Data

Mar. 17, 2000 (JP) ........................................ 2000-077290

(51) Int. Cl.⁷ .................. B01J 8/00; F17C 11/00; F17C 13/02; C01B 3/56; B01D 53/14

(52) U.S. Cl. .................. 422/198; 422/208; 422/211; 422/212; 422/223; 422/105; 422/109; 423/658.2; 429/19; 429/20; 436/144

(58) Field of Search .................. 422/188–190, 422/198, 211, 105, 108, 109, 83; 423/648.1, 658.2, 658.3; 429/19, 20, 22; 436/37, 144, 148

(56) References Cited

U.S. PATENT DOCUMENTS 5,638,673 A * 6/1997 Yabe ........................... 60/649
5,976,725 A * 11/1999 Gamo et al. .................. 429/25

FOREIGN PATENT DOCUMENTS

| JP | 59197546 A | * | 11/1984 | ........... C22C/38/14 |
| JP | 05319802 A | * | 12/1993 | ............. C01B/3/56 |
| JP | 06193996 A | * | 7/1994 | ........... F25B/17/12 |
| JP | 08094610 A | * | 4/1996 | ......... G01N/33/20 |
| JP | 10-245202 A | * | 9/1998 | ............. C01B/3/56 |

* cited by examiner

Primary Examiner—Hien Tran
Assistant Examiner—Jennifer Leung
(74) Attorney, Agent, or Firm—Lahive & Cockfield, LLP; Anthony A. Laurentano, Esq.

(57) ABSTRACT

A hydrogen-occlusion alloy regenerating apparatus includes a deterioration detecting means for detecting that a hydrogen-occlusion alloy capable of occluding hydrogen in a reformed gas produced by a reformer and of releasing the hydrogen has been deteriorated due to the deposition of impurities in the reformed gas, and a regenerating section for regenerating the deteriorated hydrogen-occlusion alloy based on a detection signal from the deterioration detecting means.

9 Claims, 15 Drawing Sheets

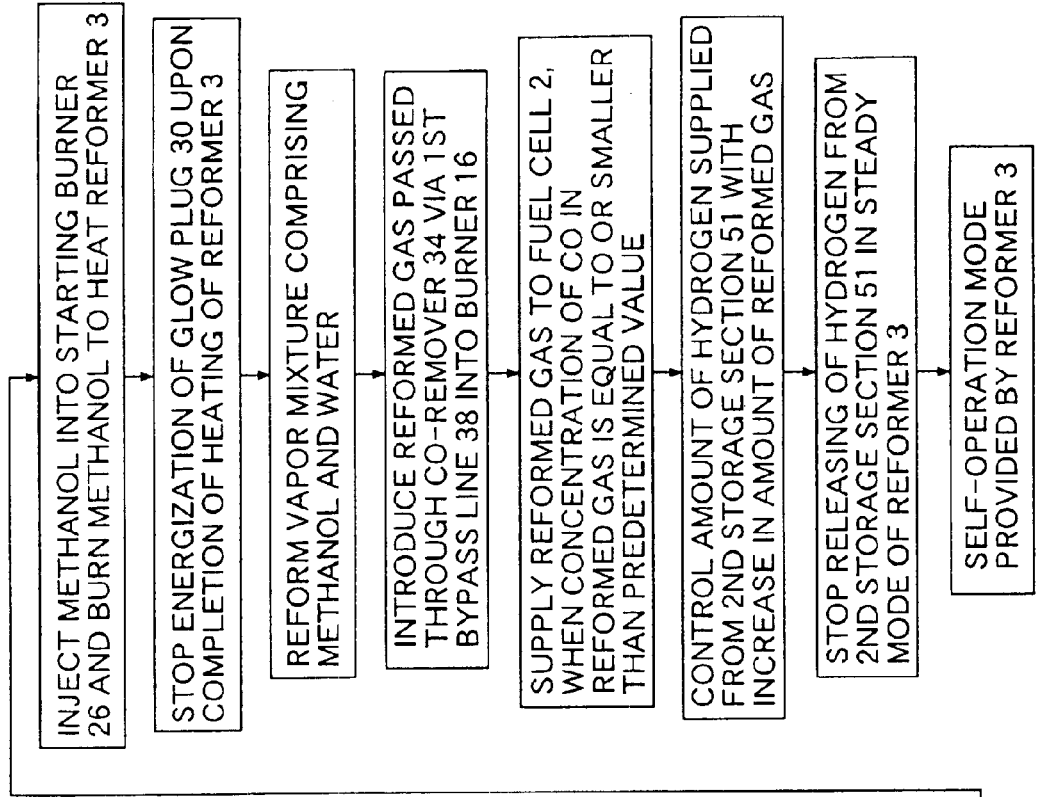
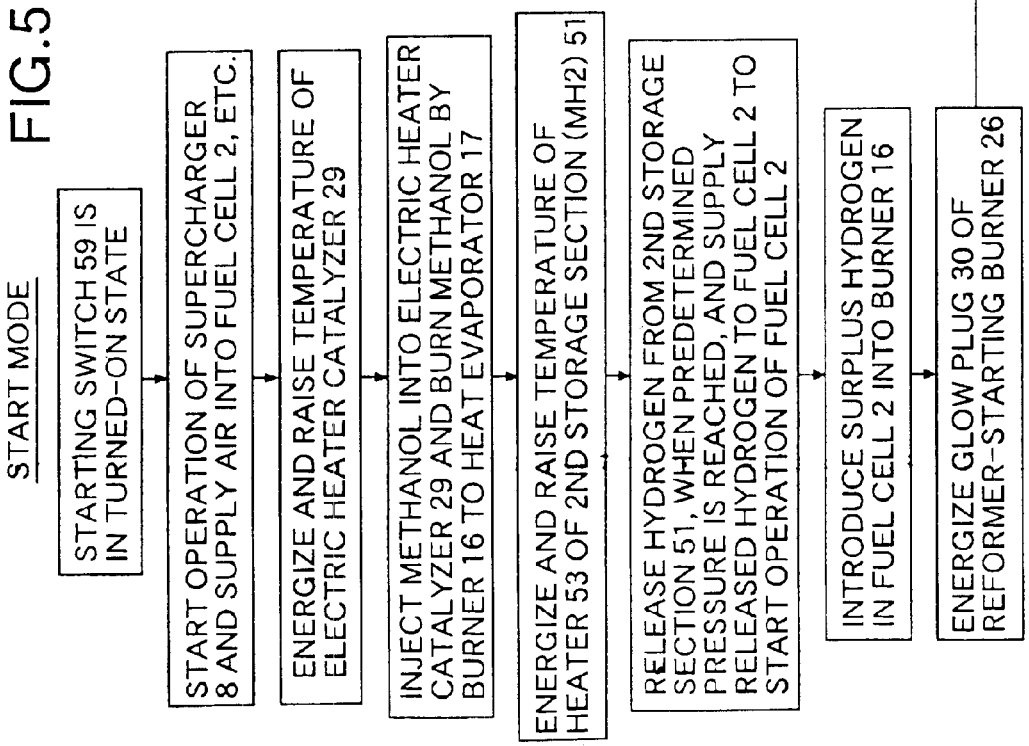
FIG.5

HYDROGEN-OCCLUSION ALLOY REGENERATING APPARATUS

BACKGROUND OF THE INVENTION

1. Field of the Invention

The present invention relates to a hydrogen-occlusion alloy regenerating apparatus, and particularly, to a hydrogen-occlusion alloy regenerating apparatus for use in fuel cell power generating system comprising a reformer for producing a reformed gas containing hydrogen from a starting fuel such as an alcohol, a gasoline or the like, a hydrogen reservoir having a hydrogen-occlusion alloy capable of occluding and releasing hydrogen, and a fuel cell to which hydrogen released from the hydrogen reservoir is supplied.

2. Description of the Related Art

The reformed gas produced by the reformer includes impurities such as CO, $CO_2$, $O_2$ and the like in addition to hydrogen as a main component. If the impurities are deposited on the hydrogen-occlusion alloy, the hydrogen-occlusion alloy is deteriorated, resulting in a reduced amount of hydrogen-occlusion and a reduced hydrogen-occluding rate.

A conventionally employed means for avoiding the deterioration uses a hydrogen-occlusion alloy that has been subjected to a plating treatment using Pd, Ni or the like.

In the case of the hydrogen-occlusion alloy subjected to the plating treatment, the amount of hydrogen-occlusion is large, as compared with a hydrogen-occlusion alloy not subjected to a plating treatment, but the amount of hydrogen-occlusion decreases with the passage of time. Therefore, the means for avoiding the deterioration due to the impurities is unsatisfactory. Also in the case where a powdery hydrogen-occlusion alloy is subjected to a plating treatment, there is a problem that the operation is extremely complicated.

SUMMARY OF THE INVENTION

Accordingly, it is an object of the present invention to provide a hydrogen-occlusion alloy regenerating apparatus of the type described above, wherein when a hydrogen-occlusion alloy is deteriorated due to the deposition of impurities, such deteriorated hydrogen-occlusion alloy can be regenerated.

To achieve the above object, according to the present invention, there is provided a hydrogen-occlusion alloy regenerating apparatus, comprising a deterioration detecting means for detecting that a hydrogen-occlusion alloy capable of occluding and releasing hydrogen contained in a reformed gas produced by a reformer has been deteriorated due to impurities contained in the reformed gas, and a regenerating section for regenerating the deteriorated hydrogen-occlusion alloy, based on a detection signal from the deterioration detecting means.

If the hydrogen-occlusion alloy regenerating apparatus is constructed as described above, the intended object can be achieved.

According to the present invention, there is also provided a hydrogen-occlusion alloy regenerating apparatus for use in a fuel cell power generating system, the fuel cell power generating system including a reformer for producing a reformed gas containing hydrogen from a starting fuel, a hydrogen reservoir containing a hydrogen-occlusion alloy capable of occluding and releasing the hydrogen, and a fuel cell to which hydrogen released from the hydrogen reservoir is supplied, wherein the hydrogen-occlusion alloy regenerating apparatus includes a deterioration detecting means for detecting that the hydrogen-occlusion alloy has been deteriorated due to the deposition of impurities contained in the reformed gas, a remaining-amount detecting means for detecting that the remaining amount of hydrogen-occlusion in the hydrogen reservoir has reached such an amount that a regenerating treatment is required for the hydrogen-occlusion alloy, and a heating means for heating the hydrogen-occlusion alloy to remove the impurities by the released hydrogen, based on both detection signals from the deterioration detecting means and the remaining-amount detecting means.

If the hydrogen-occlusion alloy regenerating apparatus is constructed as described above, hydrogen released from the hydrogen-occlusion alloy, namely, highly active hydrogen atoms are reacted with CO, $CO_2$, $O_2$ and the like to produce $CH_4$, $H_2O$ and the like, thereby removing the impurities from the hydrogen-occlusion alloy to regenerate the hydrogen-occlusion alloy. The life of the hydrogen-occlusion alloy can be extended by repeatedly carrying out such regenerating treatment.

With regard to the apparatus, if the hydrogen-occlusion alloy is deteriorated, a peculiar variation in flow rate is produced, for example, when hydrogen is occluded in the hydrogen-occlusion alloy. Therefore, an existing flowmeter for measuring an amount of hydrogen supplied to the hydrogen reservoir can be used as the deterioration detecting means; an existing flowmeter for measuring an amount of hydrogen released from the hydrogen reservoir can be used as the remaining-amount detecting means; and an existing heating means required for releasing the hydrogen from the hydrogen reservoir can be used as the heating means. Therefore, the apparatus can be constructed at a low cost.

BRIEF DESCRIPTION OF THE DRAWINGS

FIG. 5 is a flow chart in a start mode;

DESCRIPTION OF THE PREFERRED EMBODIMENTS

[First Embodiment]

I. Fuel Cell Power Generating System

Figure 1:
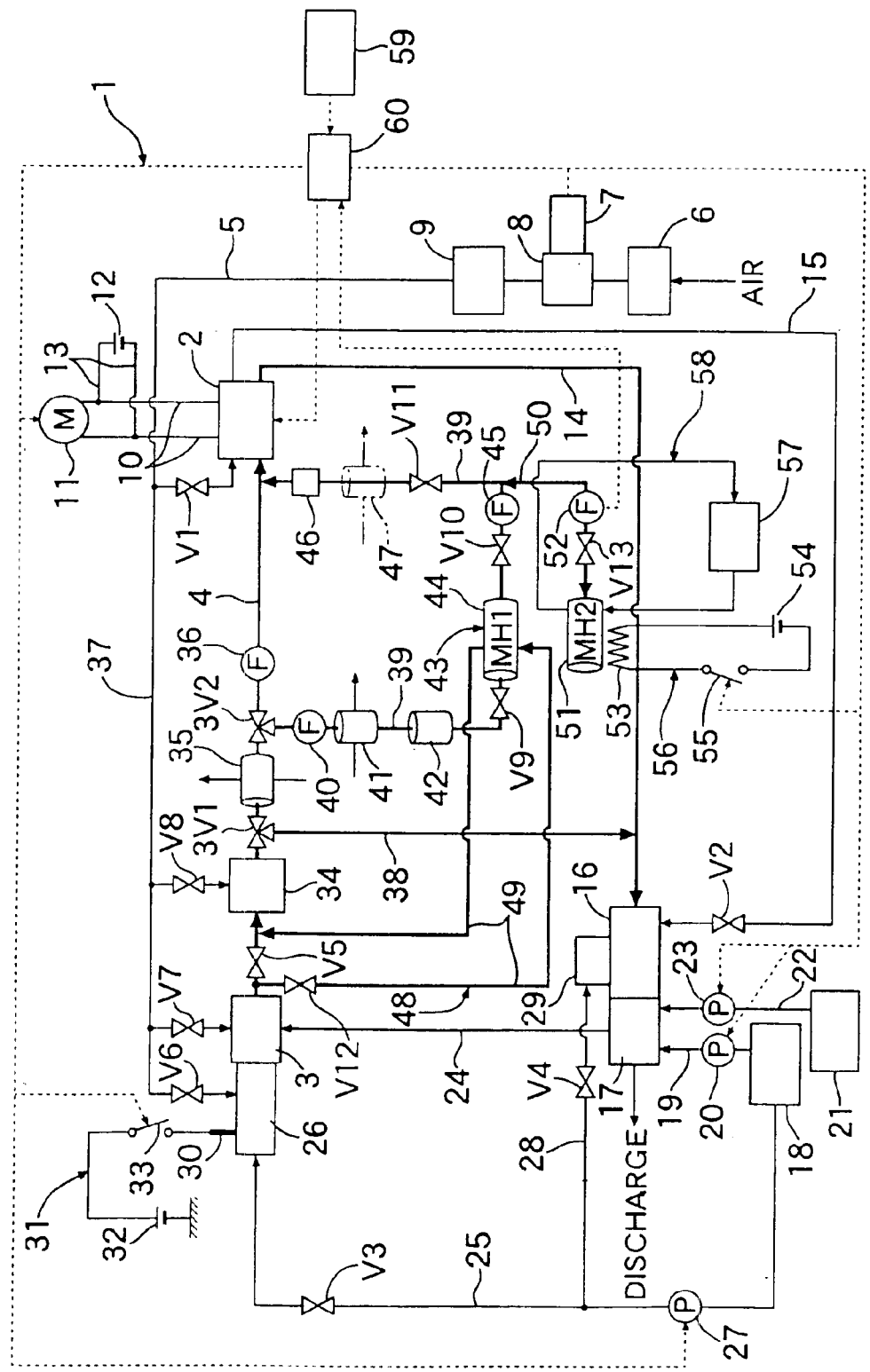
FIG. 1 is an illustration of an embodiment of a fuel cell power generating system provided with a hydrogen-occlusion alloy regenerating apparatus.

A fuel cell power generating system 1 shown in FIG. 1 is mounted on an electric vehicle using a fuel cell 2 as a power source.

In the fuel cell power generating system 1, a reformer 3 produces a reformed gas containing hydrogen from a starting fuel such as an alcohol, a gasoline and the like, and is connected at its supply side to an reformed gas inlet of the fuel cell 2 through a supply line 4. An air cleaner 6, a supercharger 8 having a motor 7 and an intercooler 9 are provided in an introducing region of an air supply line 5, and the air supply line 5 is connected at its outlet to an air inlet of the fuel cell 2. A first two-way valve V1 is mounted in the supply line 5 in the vicinity of the fuel cell 2. A pair of connection terminals of the fuel cell 2 are connected to a vehicle driving motor 11 through a pair of conductor wires 10, and a pair of connection terminals of a motor-driving auxiliary battery 12 are connected to the conductor wires 10 through a pair of conductor wires 13.

The fuel cell 2 is connected at its reformed gas outlet and its air outlet to a burner 16 for an evaporator through discharge lines 14 and 15 respectively, and a second two-way valve V2 is mounted in the air discharge line 15 in the vicinity of the burner 16. A methanol tank 18 is connected at one of its outlets to one of inlets of the evaporator 17 through a supply line 19, and a pump 20 is mounted in the supply line 19. A water tank 21 is connected at its outlet to the other inlet of the evaporator 17 through a supply line 22, and a pump 23 is mounted in the supply line 22. The evaporator 17 is connected at its outlet to an introduction side of the reformer 3 through a line 24 for a vapor mixture comprising methanol and water. The other outlet of the methanol tank 18 is connected to a reformer-starting burner 26 through another supply line 25, and a pump 27 and a third two-way valve V3 are mounted in the line 25 sequentially from the side of the methanol tank 18. The supply line 25 is connected at a location between the pump 27 and the third two-way valve V3 to an electric heater catalyzer 29 of the evaporator burner 16 through another supply line 28, and a fourth two-way valve V4 is mounted in the supply line 28 in the vicinity of the electric heater catalyzer 29. The reformer-starting burner 26 is provided with a heating circuit 31 which includes a glow plug 30, a battery 32 and a switch 33 locate between the battery 32 and the burner 26.

A fifth two-way valve V5, a carbon monoxide (CO) remover 34, a first three-way valve 3V1, a heat exchanger 35, a second three-way valve 3V2 and a first flowmeter 36 are disposed in the reformed gas supply line 4 sequentially from the side of the reformer 3. A supply line 37 diverged from the air supply line 5 at a location upstream of the first two-way valve V1 in the vicinity of the fuel cell 2 is further diverged into three branches which are connected to the reformer-starting burner 26, the reformer 3 and the CO-remover 34. Sixth, seventh and eighth two-way valves V6, V7 and V8 are mounted in the branches of the supply line 37 in the vicinity of the burner 26, the reformer 3 and the CO-remover 34, respectively. Air is used to control the burning and the temperature in the burner 26, to control the temperature in the reformer 3, and further to oxidize CO contained in the reformed gas to $CO_2$ in the CO-remover 34. The first three-way valve 3V1 located on the outlet side of the CO-remover 34 is connected to the reformed-gas discharge line 14 of the fuel cell 2 through a first bypass line 38.

The second three-way valve 3V2 located downstream of the heat exchanger 35 is connected to a portion of the reformed-gas supply line 4 between the first flowmeter 36 and the inlet of the fuel cell 2 by way of a second bypass line 39. A second flowmeter 40, a heat exchanger 41, a water remover 42, a ninth two-way valve V9, a first storage section 44 of a hydrogen reservoir 43, a tenth two-way valve V10, a third flowmeter 45, an eleventh two-way valve V11 and a flow rate control valve 46 are disposed in the second bypass line 39 sequentially from the side of the second three-way valve 3V2. As required, a heat exchanger 47 may be disposed between the flow rate control valve 46 and the eleventh two-way valve V11 in order to enhance the accuracy of the temperature control.

A heating device 48 is associated with the first storage section 44. The heating device 48 includes a reformed-gas flow line 49 which is connected at its inlet to the reformed-gas supply line 4 at a location between the reformer 3, and the fifth two-way valve V5, and at its outlet to the reformed-gas supply line 4 at a location between the fifth two-way valve V5 and the CO-remover 34. A twelfth two-way valve V12 is mounted on the inlet side of the line 49.

A second storage section 51 of the hydrogen reservoir 43 is connected to the second bypass line 39 at a location downstream of the first storage section 44 between the third flowmeter 45 and the eleventh two-way valve V11 through a hydrogen supply/discharge line 50, and a thirteenth two-way valve V13 and a fourth flowmeter 52 are disposed in the hydrogen supply/discharge line 50 sequentially from the side of the second storage section 51.

Associated with the second storage section 51 are a heating circuit 56 including a heater 53, a battery 54 and a switch 55, and a cooling section 57 including a radiator, a water pump, a water tank and the like.

The fuel cell 2, the vehicle-driving motor 11, the switch 33 of the heating circuit 31 including the glow plug 30, the pumps 20, 23 and 27, as well as the switch 55 of the heating circuit 56 including the heater 53 are controlled through an ECU 60, so that they are brought into an operative state by turning a starting switch 59 on, and brought into an inoperative state by turning the starting switch 59 off.

Figure 2:
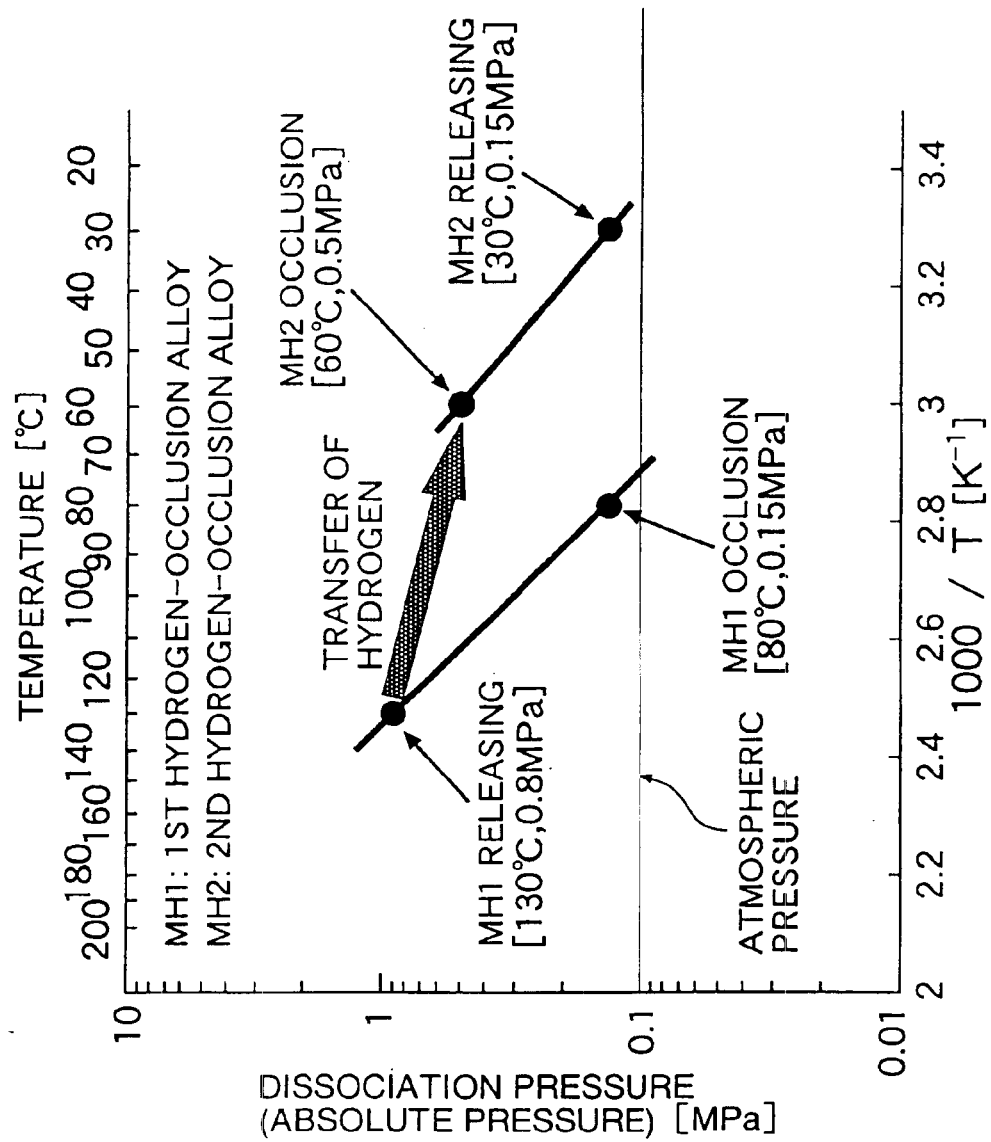
FIG. 2 is a graph showing hydrogen occluding/releasing characteristics of first and second hydrogen-occlusion alloys.

Hydrogen produced by the reformer 3 can be occluded in the hydrogen reservoir 43, and the occluded hydrogen can be released from the hydrogen reservoir 43. The first storage section 44 includes a so-called through-type tank having an inlet and an outlet. The inlet is connected to an upstream portion of the second bypass line 39, while the outlet is connected to a downstream portion of the second bypass line 39, and a first hydrogen-occlusion alloy MH1 is filled in the tank. The second storage section 51 includes an ordinary tank having an outlet also serving as an inlet, and a second hydrogen-occlusion alloy MH2 is filled in the tank. As shown in FIG. 2, the first hydrogen-occlusion alloy MH1 is of a low-pressure occluding/high-temperature releasing type and has characteristics to occlude hydrogen at 80° C. under 0.15 MPa and to release hydrogen at 130° C. under 0.8 MPa. As such a hydrogen-occlusion alloy, $LaNi_{3.96}Co_{0.6}Al_{0.44}$ may be used. The second hydrogen-occlusion alloy MH2 is of a high-pressure occluding/low-temperature releasing type, and has characteristics to occlude hydrogen at 60° C.

under 0.5 MPa and to release hydrogen at 30° C. under 0.15 MPa. As such a hydrogen-occlusion alloy, $NmNi_{4.04}Co_{0.6}Mn_{0.31}Al_{0.5}$ (Mn is misch metal) may be used.

With the above-mentioned arrangement, when hydrogen is transferred from the first storage section 44 to the second storage section 51, the hydrogen released at a high temperature and under a high pressure from the first storage section 44 can be introduced into the second storage section 51 by utilizing the hydrogen releasing characteristic of the first hydrogen-occlusion alloy MH1, and be forcedly occluded quickly and sufficiently into the second hydrogen-occlusion alloy MH2. On the other hand, the releasing of the hydrogen from the second storage section 51 is carried out at a low temperature.

II. Hydrogen-occlusion Alloy Regenerating Apparatus

The hydrogen-occlusion alloy regenerating apparatus includes a deterioration detecting means for detecting the deterioration of the second hydrogen-occlusion alloy MH2 due to the deposition of impurities contained in the reformed gas, a remaining-amount detecting means for detecting that the remaining amount of hydrogen-occlusion in the second storage section 51 of the hydrogen reservoir 43 has reached such an amount that a regenerating treatment is required for the second hydrogen-occlusion alloy MH2, and a heating means for heating the second hydrogen-occlusion alloy MH2 in order to remove the impurities by means of released hydrogen, based on detection signals from both the deterioration detecting means and the remaining-amount detecting means. Therefore, the remaining-amount detecting means and the heating means constitute a regenerating section for regenerating the deteriorated second hydrogen-occlusion alloy MH2, based on a detection signal from the deterioration detecting means.

(1) Deterioration Detecting Means

When impurities such as CO, $CO_2$, $O_2$ contained in the reformed gas have been deposited on the first hydrogen-occlusion alloy MH1 in the first storage section 44, the impurities are removed by heating the first hydrogen-occlusion alloy MH1 to 130° C. every time hydrogen is released, but the temperature at the time of releasing of the hydrogen from the second hydrogen-occlusion alloy MH2 in the second storage section 51 is 30° C., and it is difficult to remove the impurities deposited on the alloy MH2 at such a low temperature. Therefore, the deterioration of the second hydrogen-occlusion alloy occurs.

Figure 3:
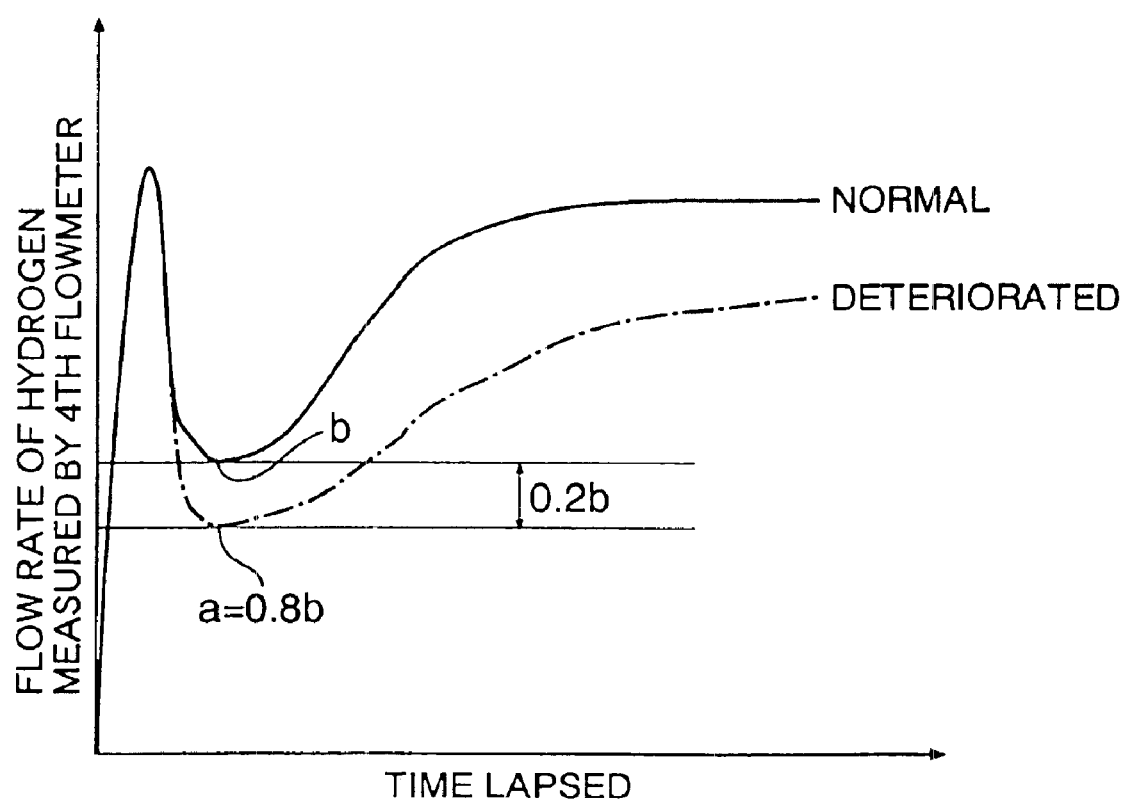
FIG. 3 is a graph showing the relationship between time lapsed and the flow rate of hydrogen measured by a fourth flowmeter.

Such deterioration of the second hydrogen-occlusion alloy is detected as a peculiar fluctuation in flow rate produced when hydrogen is occluded in the second hydrogen-occlusion alloy. More specifically, when high-pressure hydrogen is supplied from the first storage section 44 to the second storage section 51, the hydrogen flows rapidly into the second storage section 51, because the second storage section 51 is initially at a low temperature. At this time, the flow rate increases up to a peak, and thereafter varies in such a manner that the flow rate once decreases and then increases again, as shown in FIG. 3. When the second hydrogen-occlusion alloy MH2 is not deteriorated, or is deteriorated to a low degree, namely, is normal, the degree of the flow rate drop after passing the peak is lower, as shown by a solid line in FIG. 3, but when the alloy MH2 is deteriorated to a high degree, namely, to a degree that the alloy MH2 needs regeneration, the degree of the flow rate drop becomes higher. Therefore, when the flow rate a during the drop decreases by 20% from the flow rate b during the drop in the case where the alloy MH2 is normal, namely, when a=0.8 b, it is determined that the second hydrogen-occlusion alloy MH2 has been deteriorated. This can be detected by the fourth flowmeter 52 for measuring the amount of hydrogen supplied to the second storage section 51. Therefore, the fourth flowmeter 52 has a function as a deterioration detecting means for detecting that the second hydrogen-occlusion alloy MH2 has been deteriorated due to the deposition of the impurities. In addition, it can be seen from FIG. 3 that when the second hydrogen-occlusion alloy MH2 has been deteriorated, the amount of hydrogen-occlusion in the second hydrogen-occlusion alloy MH2 becomes smaller, and the hydrogen occluding rate becomes lower than that when the second hydrogen-occlusion alloy MH2 is normal.

(2) Remaining-amount Detecting Means

The regenerating treatment for the second hydrogen-occlusion alloy MH2 is conducted by heating the second hydrogen-occlusion alloy MH2 and maintaining it at a temperature of 120° C. for 10 minutes to release hydrogen from the second hydrogen-occlusion alloy MH2. In this case, an amount of hydrogen occluded of at least about 0.015% by weight is required for the regeneration of the second hydrogen-occlusion alloy MH2 made of the above-described material. When the total sum of the volume in the second storage section 51 and the volume in the line extending from the second storage section 51 to the thirteenth two-way valve V13 is 3 liters, if the upper limit pressure used in the second storage section 51 is set at 1 MPa, an amount of hydrogen occluded of 0.037% by weight at 120° C. is an upper limit value, for the amount of hydrogen released to satisfy such a regenerating treatment.

If the amount of hydrogen occluded in a full state of the second hydrogen storage 51 is 0.8% by weight, the amount of hydrogen required for the regenerating treatment is 1.9% [(0.015/0.8)×100]~4.6% [(0.037/0.8)×100].

Even if the second hydrogen-occlusion alloy MH2 is heated to 120° C., all of the hydrogen cannot be released, and about 5% of the amount of hydrogen occluded in the full state is left.

Figure 4:
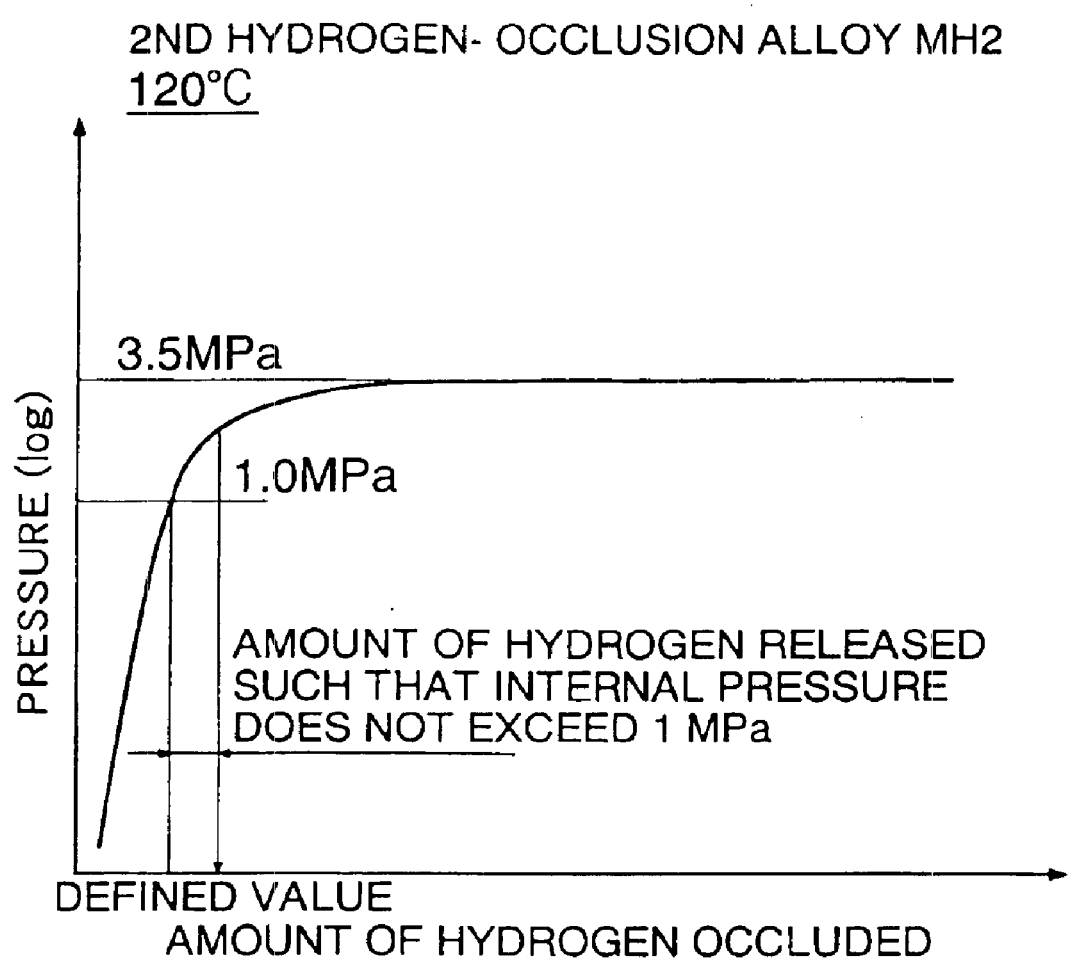
FIG. 4 is a graph showing a PCT curve at 120° for the second hydrogen-occlusion alloy.

In consideration of the foregoing, when the remaining amount of hydrogen occluded in the second hydrogen-occlusion alloy MH2 becomes equal to or smaller than 9.6% (4.6%+5%) of the amount of hydrogen occluded in the full state, as shown by the PCT curve at 120° C. for the second hydrogen-occlusion alloy MH2 in FIG. 4, if the regenerating treatment is carried out, the regenerating treatment can be carried out sufficiently while maintaining the internal pressure of the second storage section 51 at a value equal to or lower than 1 MPa.

The measurement of such remaining amount of hydrogen occluded can be carried out by the fourth flowmeter 52 for measuring the amount of hydrogen supplied to the second storage section 51 and the amount of hydrogen released from the second storage section 51. Therefore, the fourth flowmeter 52 functions as a remaining-amount detecting means for detecting that the remaining amount of hydrogen occluded in the second storage section 51 has reached an amount required for regenerating treatment of the second hydrogen occlusion alloy MH2.

(3) Heating Means

The heating circuit 56 associated with the second storage section 51 is used also as the heating means.

A deterioration detection signal and a remaining-amount detection signal from the fourth flowmeter 52 are transferred to the ECU 60, and the switch 55 of the heating circuit 56 is opened and closed under the control of the ECU 60 based on both the signals.

Various modes will be described with reference to FIGS. 1, 5 to 8.

A. Start Mode

The amount of hydrogen occluded in the second storage section 51 of the hydrogen reservoir 43 is full before starting of this mode. The first to thirteenth two-way valves V1 to V13 and the flow rate control valve 46 are in a "close" state, and the first three-way valve 3V1 is switched such that the reformed gas can be supplied to the evaporator burner 16, namely, such that it is opened toward the burner 16. On the other hand, the second three-way valve 3V2 is switched such that the reformed gas can be supplied to the first storage section 44, namely, such that it is opened toward the first storage section 44.

Referring to FIGS. 1 and 3, when the starting switch 59 is turned on, the supercharger 8 is operated, and air is supplied to the fuel cell 2 via the air cleaner 6, the supercharger 8 and the intercooler 9 with the first two-way valve V1 being in an "open" state, and is also supplied to the burner 26 for the reformer 3, the reformer 3 and the CO-remover 34 with the sixth to eight two-way valves V6 to V8 being in an "open" state. The air discharged from the fuel cell 2 is introduced into the evaporator burner 16 with the second two-way valve V2 is in an "open" state.

The electric heater catalyzer 29 of the evaporator burner 16 is energized, and when the temperature of the electric heater catalyzer 29 is raised, the pump 27 is operated, whereby methanol is injected into the electric heater catalyzer 29 with the fourth two-way valve V4 being "open", and the methanol is burned in the burner 16 to heat the evaporator 17.

The switch 55 of the heating circuit 56 for the second storage section 51 is closed, whereby the second storage section 51 is heated by the heater 53. In this case, the second storage section 51 and thus the second hydrogen-occlusion alloy MH2 can be heated in a short time to about 30° C. which is a hydrogen-releasing temperature. Then, the pressure in the outlet also serving as the inlet in the second storage section 51 is detected. When the pressure has reached about 0.15 MPa, the hydrogen occluded in the second storage section 51 is released with the thirteenth and eleventh two-way valves V13 and V11 and the flow rate control valve 46 being "open", thereby starting the operation. The amount of hydrogen supplied from the second storage section 51 is detected by the third flowmeter 52. A surplus hydrogen in the fuel cell 2 is introduced into the evaporator burner 16, where it is burned for utilization for hearing the evaporator 17.

In the reformer-starting burner 26, the switch 33 of the heating circuit having the glow plug 30 is closed, whereby the glow plug 30 is energized. Methanol is injected into the burner 26 with the third two-way valve V3 being "open", and the reformer 3 is heated by the burning of the methanol. The temperature of the gas at the supply port at the reformer 3 is detected, and when the temperature reaches a predetermined value, it is determined that the heating of the reformer 3 has been completed. Then, the switch 33 is opened to stop the energization of the glow plug 30.

Methanol and water are injected into the evaporator 17, where a vapor mixture comprising methanol and water is produced. This vapor mixture is supplied to the reformer 3, where the reformation is carried out.

The resulting reformed gas contains a large amount of carbon monoxide (CO), and is introduced into the CO-remover 34 with the fifth two-way valve V5 being "open". At that time, the first three-way valve 3V1 has been switched to be opened toward the burner 16 and hence, the reformed gas is then introduced into the burner 16 via the first bypass line 38, where burnable components such as hydrogen and the like are burned.

A concentration of CO in the reformed gas is detected, or examined from the relationship between the temperature of the reformed gas and time. When the concentration of CO has reached equal to or lower than a predetermined value, the first and second three-way valves 3V1 and 3V2 are switched to be opened toward the fuel cell 2, thereby supplying the reformed gas to the fuel cell 2.

The amount of reformed gas supplied from the reformer 3 which is being warmed is not sufficient to operate the fuel cell 2, but the deficiency is compensated for by the hydrogen released from the second storage section 51, thereby stabilizing the output from the fuel cell 2. The amount of hydrogen supplied is controlled so that it is gradually decreased with an increase in amount of the reformed gas.

When the temperature and pressure of the reformed gas in the supply port in the reformer 3 reach 200° C. under 0.16 MPa, respectively, it is determined that the reformer 3 has reached steady mode. Thus, the switch 55 of the heating circuit 56 is opened, and the thirteenth and eleventh two-way valves V13 and V11 and the flow rate control valve 46 located on the side of the second storage section 51 are closed and thereafter, the mode is shifted to a self-operation mode provided by the reformer 3.

When the reformed gas has been passed through the heat exchanger 35 through which cooling water having a temperature of 50° C. flows, the temperature and pressure of the reformed gas have been dropped down to about 80° C. and about 0.15 MPa, respectively. The reformed gas having such temperature and pressure is used as a fuel in the fuel cell 2.

B. Hydrogen-occlusion Mode During Steady Travel

Figure 6:
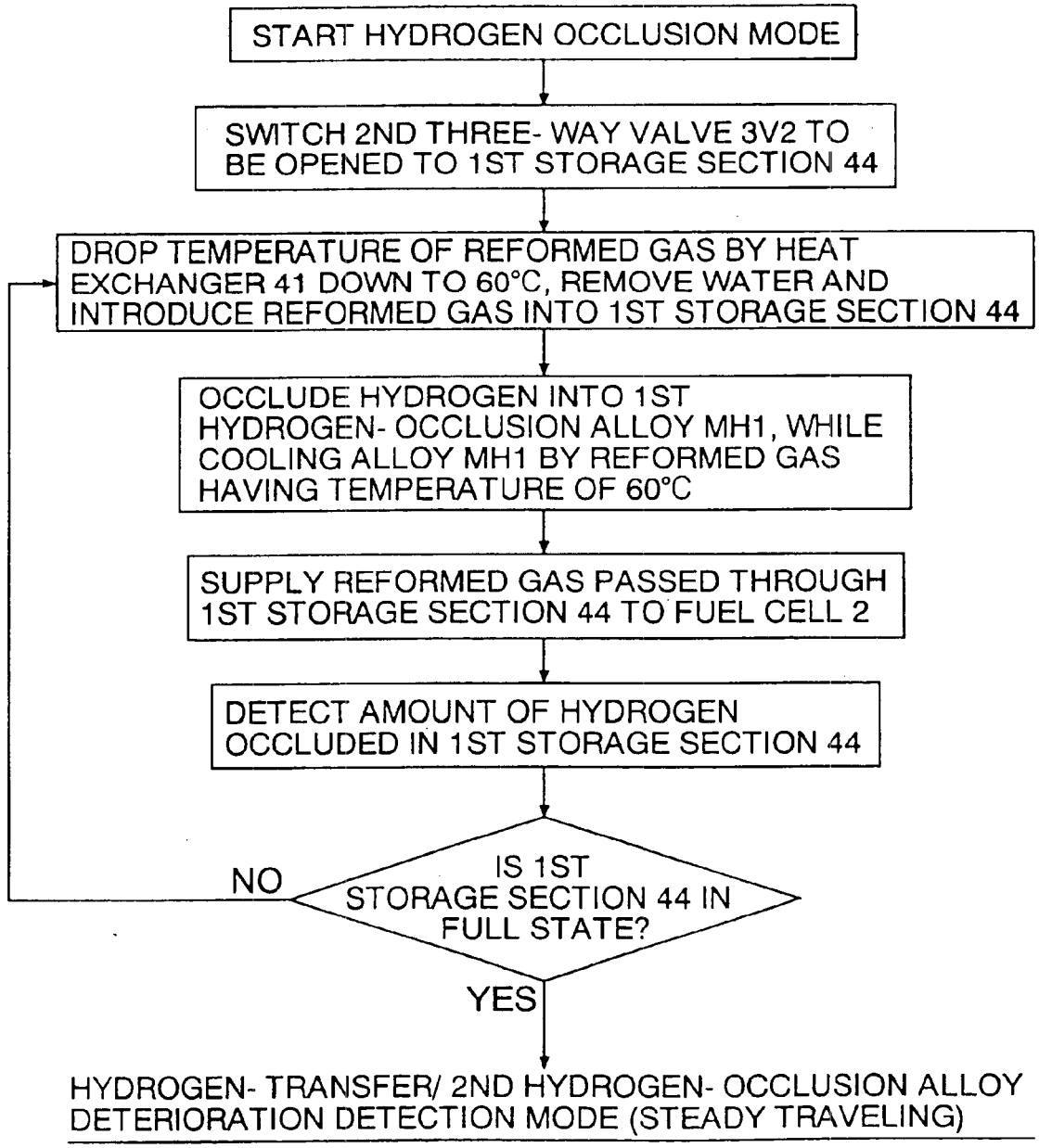
FIG. 6 is a flow chart in a hydrogen-occlusion mode.

As shown in FIGS. 1 and 6, the second three-way valve 3V2 is switched to be opened toward the first storage section 44, when the hydrogen-occlusion mode is started.

The temperature and pressure of the reformed gas in the second three-way valve 3V2 are about 80° C. and about 0.15 MPa, respectively. However, the temperature of such reformed gas is dropped to about 60° C. by the heat exchanger 41 through which cooling water having a temperature of 50° C. flows, and then, water in the reformed gas is removed by the water remover 42.

When the ninth two-way valve V9 is "open", the reformed gas having the temperature of about 60° C. and the pressure of about 0.15 MPa is introduced into the first storage section 44, where hydrogen is occluded into the first hydrogen-occlusion alloy MH1. This occlusion raises the temperature of the first hydrogen-occlusion alloy MH1 up to about 80° C. This temperature is maintained by the cooling effect of the reformed gas having the temperature of about 60° C.

The reformed gas passed through the first storage section 44 is supplied to the fuel cell 2 with the tenth and eleventh two-way valves V10 and V11 and the flow rate control valve 46 being "open", whereby the operation of the fuel cell 2 is continued.

The amount of hydrogen occluded in the first storage section 44 is detected based on a difference between accumulated flow rates provided by the second and third flowmeters 40 and 45 located on the sides of the inlet and outlet respectively of the first storage section 44. When the amount of hydrogen occluded in the first storage section 44 does not reach the value corresponding to the full state, the above-described occluding procedure is continued.

When the amount of hydrogen occluded in the first storage section 44 reaches the value corresponding to the full state, the mode is shifted to a hydrogen transfer/second hydrogen-occlusion alloy deterioration-detection mode.

Figure 7:
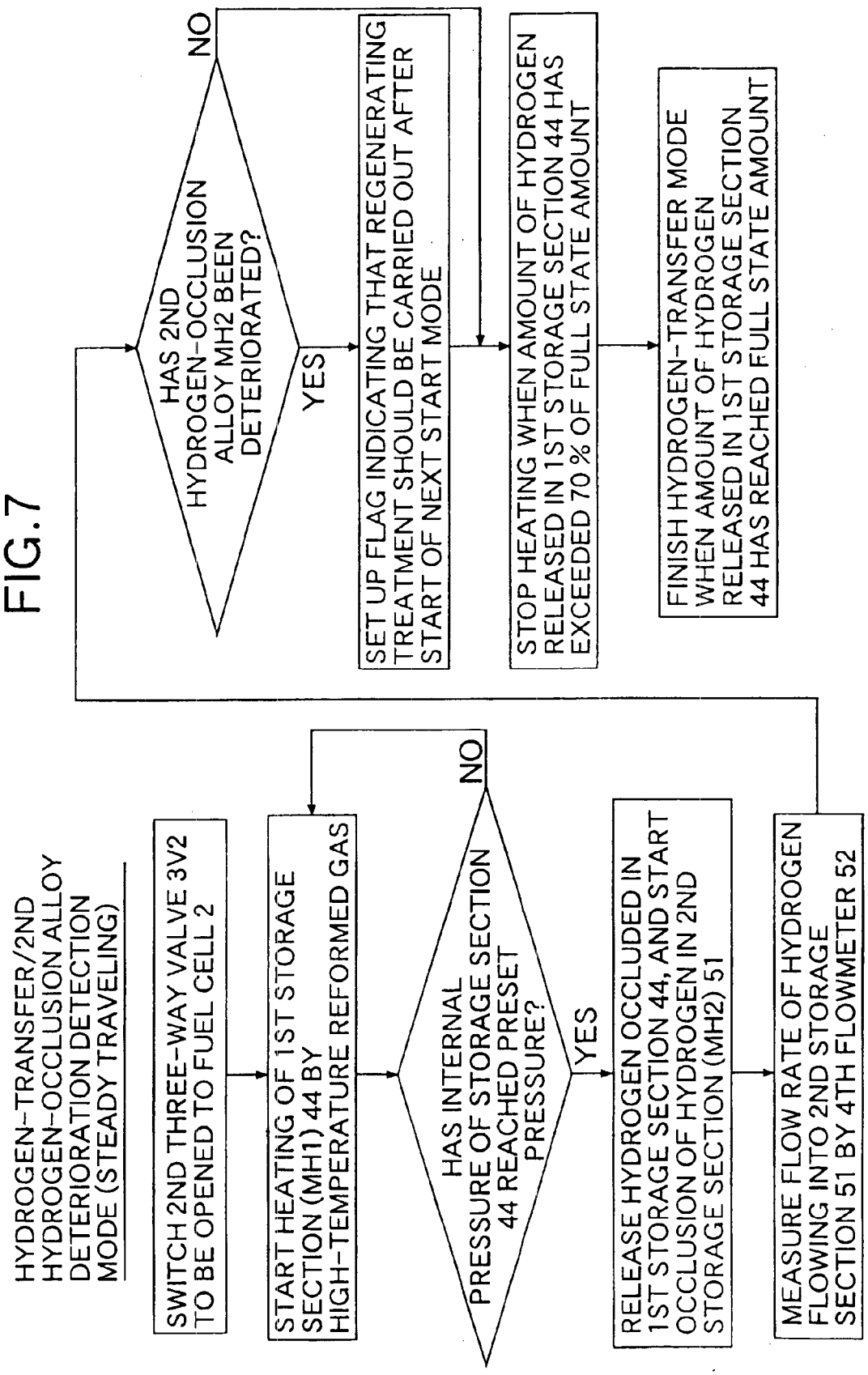
FIG. 7 is a flow chart in a hydrogen transfer/second hydrogen-occlusion alloy deterioration-detection mode.

C. Hydrogen Transfer/Second Hydrogen-occlusion Alloy Deterioration Detection Mode During Steady Traveling As shown in FIGS. 1 and 7, the second three-way valve 3V2 is switched to be opened toward the fuel cell 2. With the ninth, tenth and eleventh two-way valves V9, V10 and V11 being "close", the twelfth two-way valve V12 being "open", and the fifth two-way valve V5 being "close", the reformed gas having a high temperature of about 200° C. is passed through the heating device 48, and then supplied via the CO-remover 34, the heat exchanger 35 and the like to the fuel cell 2, whereby the operation of the fuel cell 2 is continued.

When the first hydrogen-occlusion alloy MH1 of the first storage section 44 is heated by a heat discharged from the reformed 3 in the above manner, so that the temperature is raised to about 130° C. and the pressure is raised to about 0.8 MPa, and the occluded hydrogen is released with the tenth and thirteenth two-way valves V10 and V13 being "open".

The second hydrogen-occlusion alloy MH2 of the second storage section 51 is heated to about 60° C. by the heating circuit 56, and the hydrogen released from the first storage section 44 is occluded into the second hydrogen-occlusion alloy MH2 at about 60° C. and about 0.5 MPa. The temperature raising of the alloy MH2 by this occlusion is inhibited by the cooling circuit 58, whereby the temperature of the alloy MH2 is maintained at about 60°.

A flow rate of hydrogen flowing into the second storage section 51 is measured by the fourth flowmeter 52, whereby it is detected whether the second hydrogen-occlusion alloy MH2 has been deteriorated, based on the reference in FIG. 3. If the second hydrogen-occlusion alloy MH2 has been deteriorated, a flag is set up to indicate that the regenerating treatment should be carried out after the next start mode under the control of the ECU 60 based on the detection signal from the fourth flowmeter 52. The reason why the regenerating treatment is carried out after the start mode is that the hydrogen occluded in the second hydrogen-occlusion alloy MH2 has been released for starting, whereby the remaining amount of hydrogen occluded in the alloy MH2 has been decreased down to near the above-described defined value.

When, in the above detection, the third flowmeter 45 located on the side of the outlet of the first storage section 44 detects that the amount of hydrogen released from the first storage section 44 has exceeded 70% of the amount in the full state, the heating of the first storage section 44 is stopped with the fifth two-way valve V5 being "open" and with the twelfth two-way valve V12 being "close". The releasing of hydrogen from the first storage section 44 is continued by an endothermic reaction of the first hydrogen-occlusion alloy MH1. This enables the temperature of the first storage section 44 to be dropped, thereby decreasing a time lag in the restarting of the hydrogen-occlusion mode.

When the accumulated flow rate provided by the third flowmeter 45 located on the side of the outlet of the first storage section 44 has reached the amount corresponding to the full state of the storage section 44, the transfer of hydrogen to the second storage section 51 is stopped with the thirteenth two-way valve V13 being "close". At this time, the amount of hydrogen occluded in the second storage section 51 is determined to be in a full state.

D. Second Hydrogen-occlusion Alloy Regeneration Mode

Figure 8:
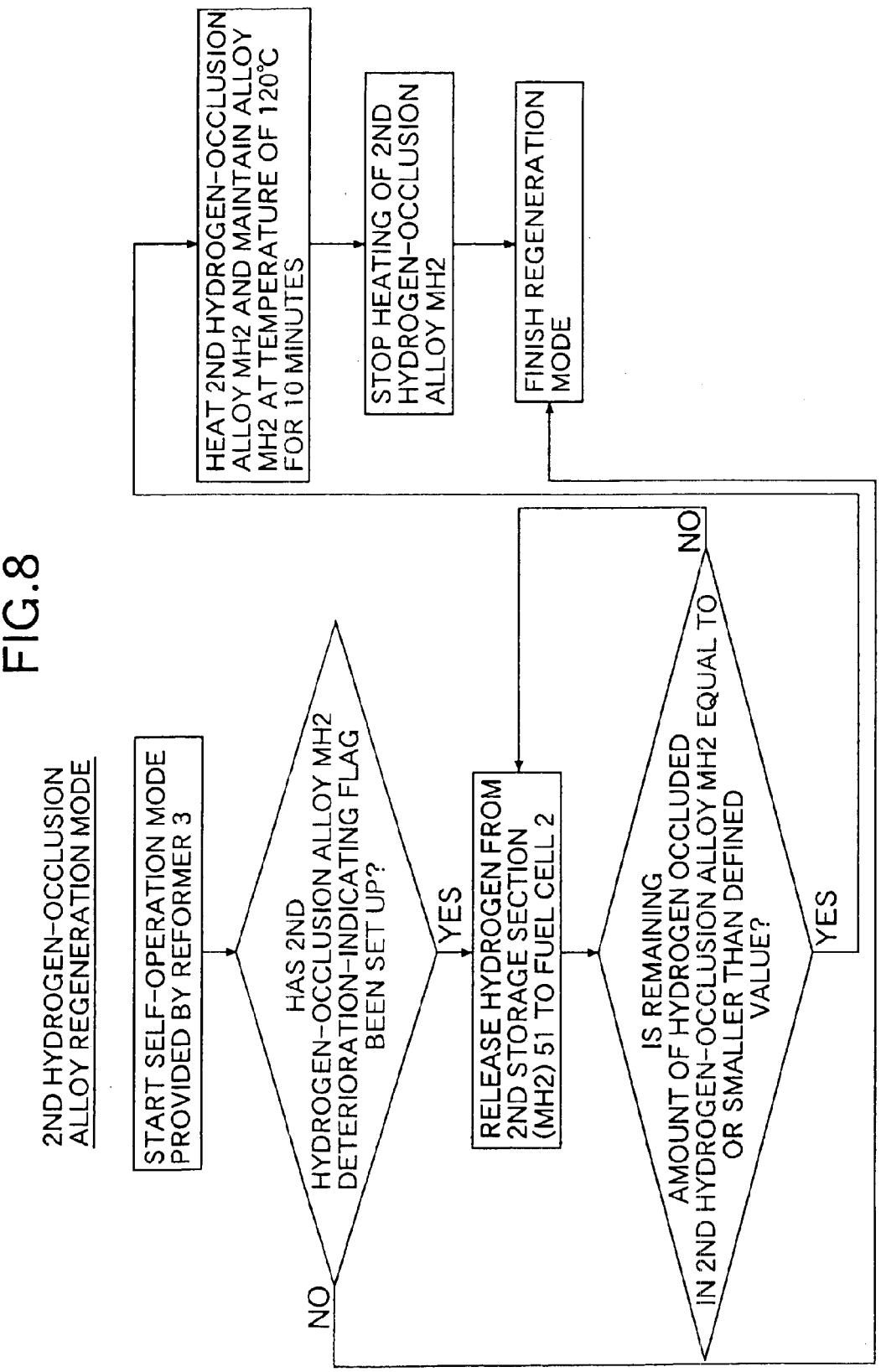
FIG. 8 is a flow chart in a second hydrogen-occlusion alloy regeneration mode.

It is determined whether the deterioration flag for the second hydrogen-occlusion alloy MH2 has been set up after start of the self-operation mode by the reformer, as shown in FIGS. 1 and 8. If the flag is not set up, the regeneration mode is shifted to the end.

On the other hand, if the deterioration flag has been set up, hydrogen is released from the second storage section 51 still having a heat to the fuel cell 2 with the thirteenth and eleventh two-way valve V13 and V11 and the flow rate control valve 46 being "open".

It is detected by the fourth flowmeter 52 whether the remaining amount of hydrogen occluded in the second hydrogen-occlusion alloy MH2 is equal to or smaller than the defined value. If the remaining amount exceeds the defined value, the releasing of hydrogen is continued. On the other hand, if the remaining amount is equal to or smaller than the defined value, the thirteenth two-way valve V13 is closed, and the switch 55 of the heating circuit 56 is closed under the control of the ECU 60 based on the detection signal from the fourth flowmeter 52, whereby the second hydrogen-occlusion alloy MH2 of the second storage section 51 is heated and maintained at a temperature of 120° C. for 10 minutes. During this period of time, the regenerating treatment is conducted.

The switch 55 of the heating circuit 56 is opened to stop the heating of the second hydrogen-occlusion alloy MH2 and thus, the regeneration mode stops.

At the end of the regeneration mode, the gaseous hydrogen present in the second storage section 51 is occluded into the hydrogen-occlusion alloy MH2 with cooling of the hydrogen-occlusion alloy MH2, produced methane and the like are passed through the fuel cell 2, and introduced into the burner 16, and recovered for thermal energy upon the next starting.

(Second Embodiment)

Figure 9:
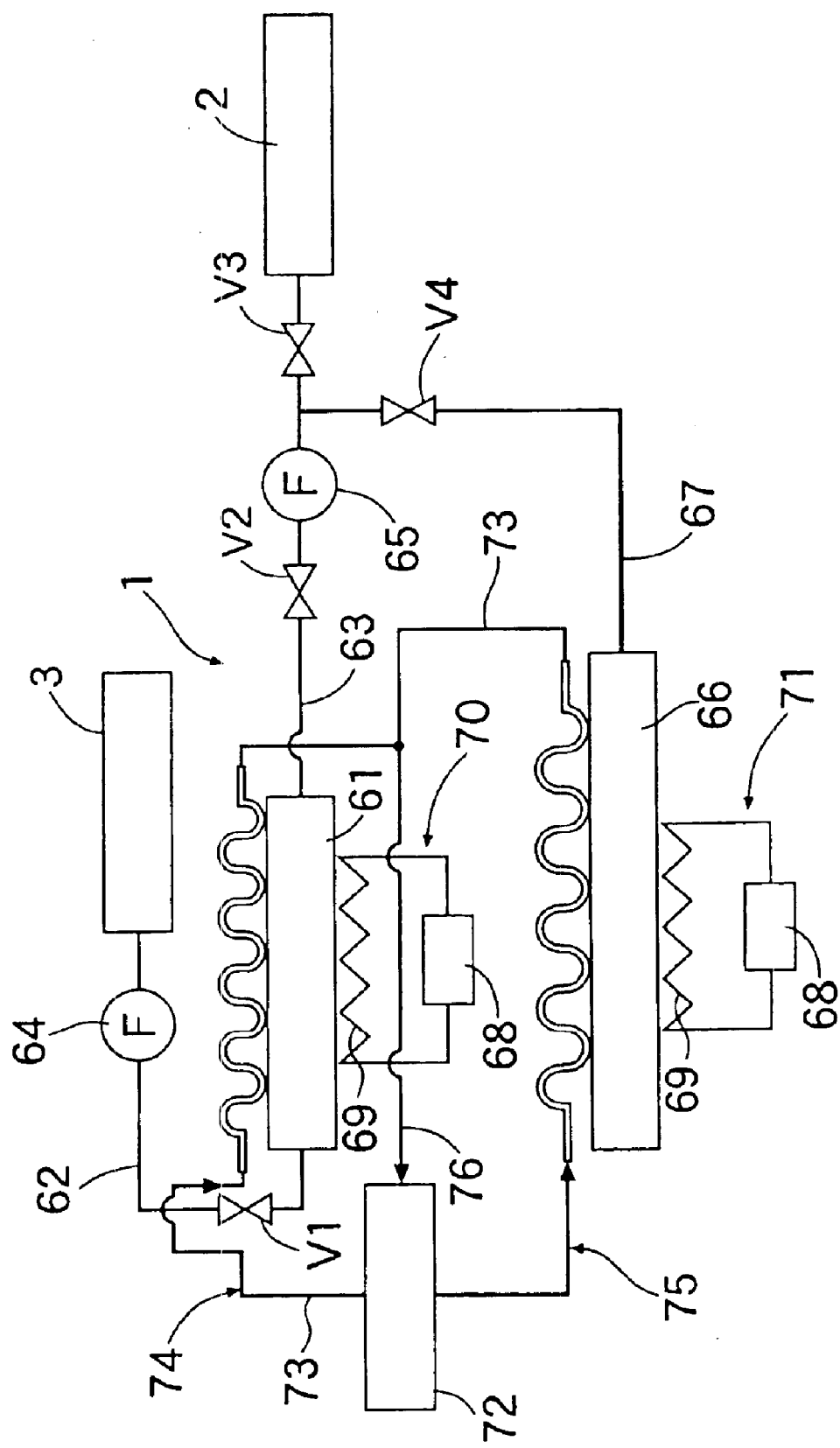
FIG. 9 is an illustration of another embodiment of a fuel cell power generating system provided with a hydrogen-occlusion alloy regenerating apparatus.

A fuel cell power generating system 1 shown in FIG. 9 is adapted to be mounted on an electric vehicle as in the first embodiment, but is different from the first embodiment in respect of that hydrogen produced by the regenerating treatment is stored. Only components required for the description are diagrammatically shown in FIG. 9.

A hydrogen reservoir 61 is intended to be subjected to the regenerating treatment, and is connected at its inlet to a supply side of the reformer 3 through a supply line 62, and at its outlet to the hydrogen inlet of the fuel cell 2 through a supply line 63. A first flowmeter 64 as a deterioration detecting means and a first two-way valve V1 are disposed in the supply line 62 on the side of the reformer 3 sequentially from the side of the reformer 3. A second flowmeter 65 as a remaining-amount detecting means and a third two-way valve V3 are disposed in the supply line 63 on the side of the fuel cell 2 sequentially from the side of the hydrogen reservoir 61. An auxiliary hydrogen reservoir 66 is intended to store hydrogen produced by the regenerating treatment and connected at its inlet and outlet to the second flowmeter 65 and the third two-way valve V3, at a location between the second flowmeter 65 and the third two-way valve V3, through an introducing/discharging line 67 having a fourth two-way valve V4.

Heating circuits 70 and 71 each including a heating section 68 having a battery, switch and the like and a heater 69 are associated with the hydrogen reservoir 61 and the auxiliary hydrogen reservoir 66 respectively. Cooling circuits 74 and 75 including a cooling section 72 having a water pump, a water tank, a radiator and the like and a cooling water passage 73 are also associated with the hydrogen reservoir 61 and the auxiliary hydrogen reservoir 66. Both the cooling circuits 74 and 75 share the cooling section 72 and the water passage 76 for returning water to the cooling section 72. The heating circuit 70 functions as heating means for hydrogen-occlusion alloy-regenerating.

Figure 10:
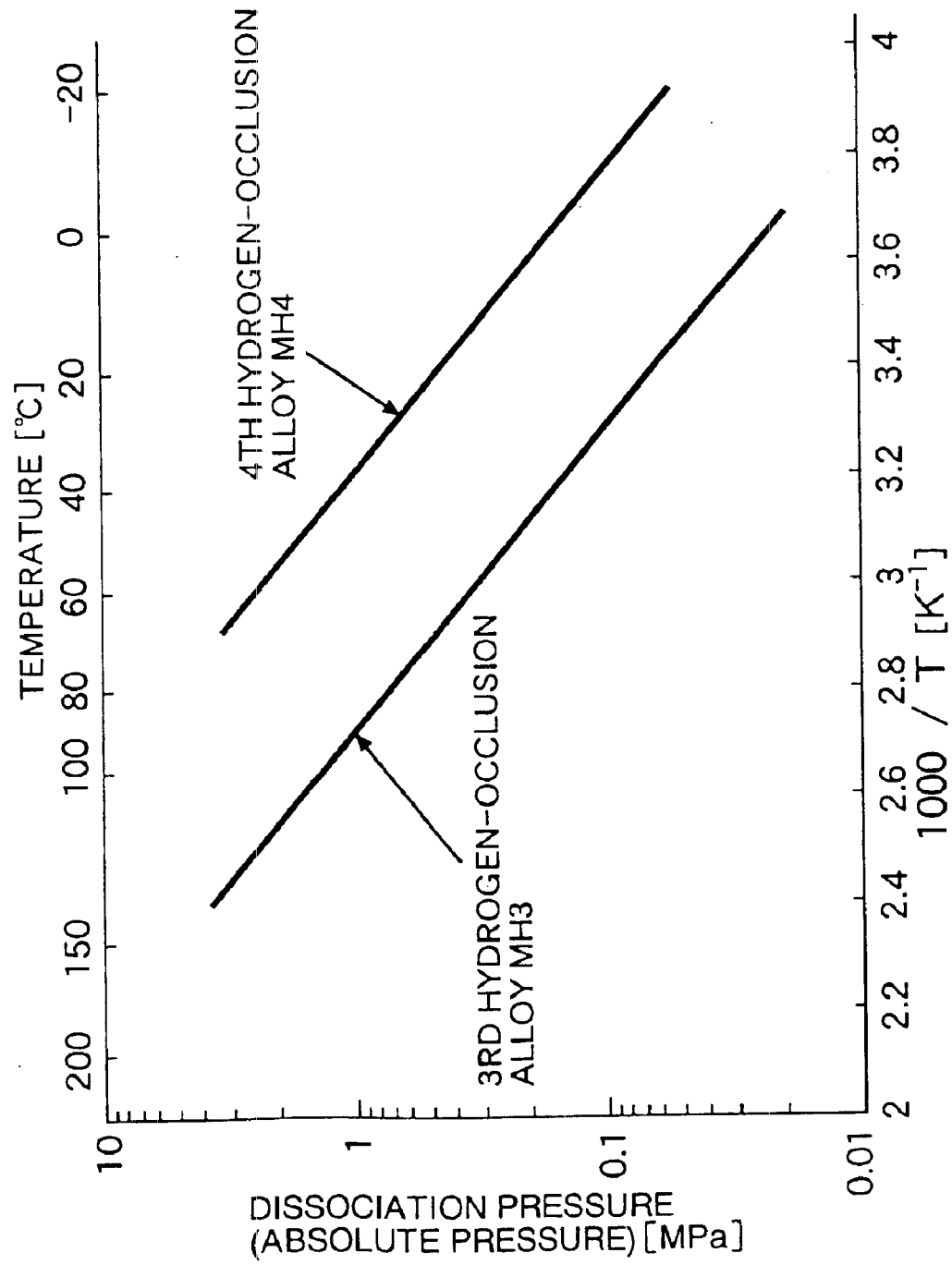
FIG. 10 is a graph showing hydrogen-occluding/releasing characteristics for third and fourth hydrogen-occlusion alloys.

The hydrogen reservoir 61 is filled with a third hydrogen-occlusion alloy MH3 shown in FIG. 10, i.e., an alloy represented by $NmNi_{4.02}Co_{0.4}Mn_{0.28}Al_{0.3}$ (Mm is misch metal). The auxiliary hydrogen reservoir 66 is filled with a fourth hydrogen-occlusion alloy MH4 shown in FIG. 10, i.e., an alloy represented by $MmNi_{4.12}Co_{0.6}Mn_{0.23}Al_{0.05}$ (Mm is misch metal).

Figure 11:
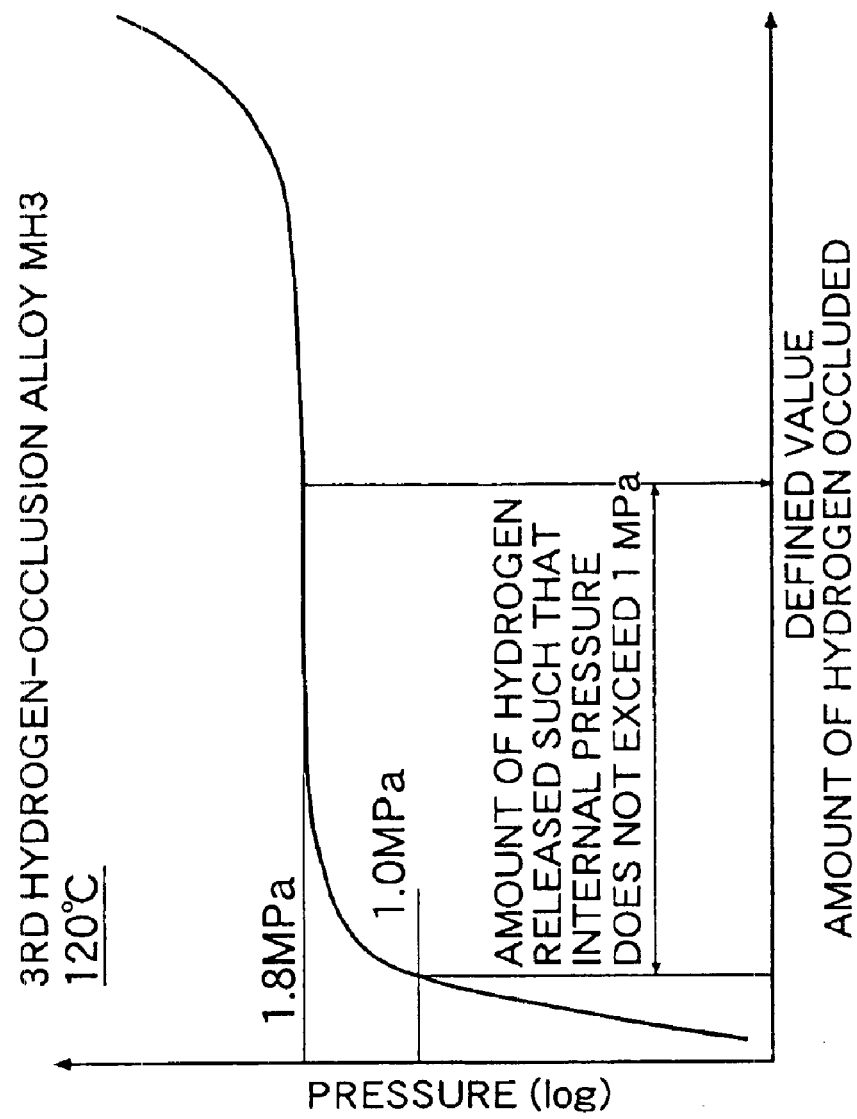
FIG. 11 is a graph showing a PCT curve at 120° for the third hydrogen-occlusion alloy.
Figure 12:
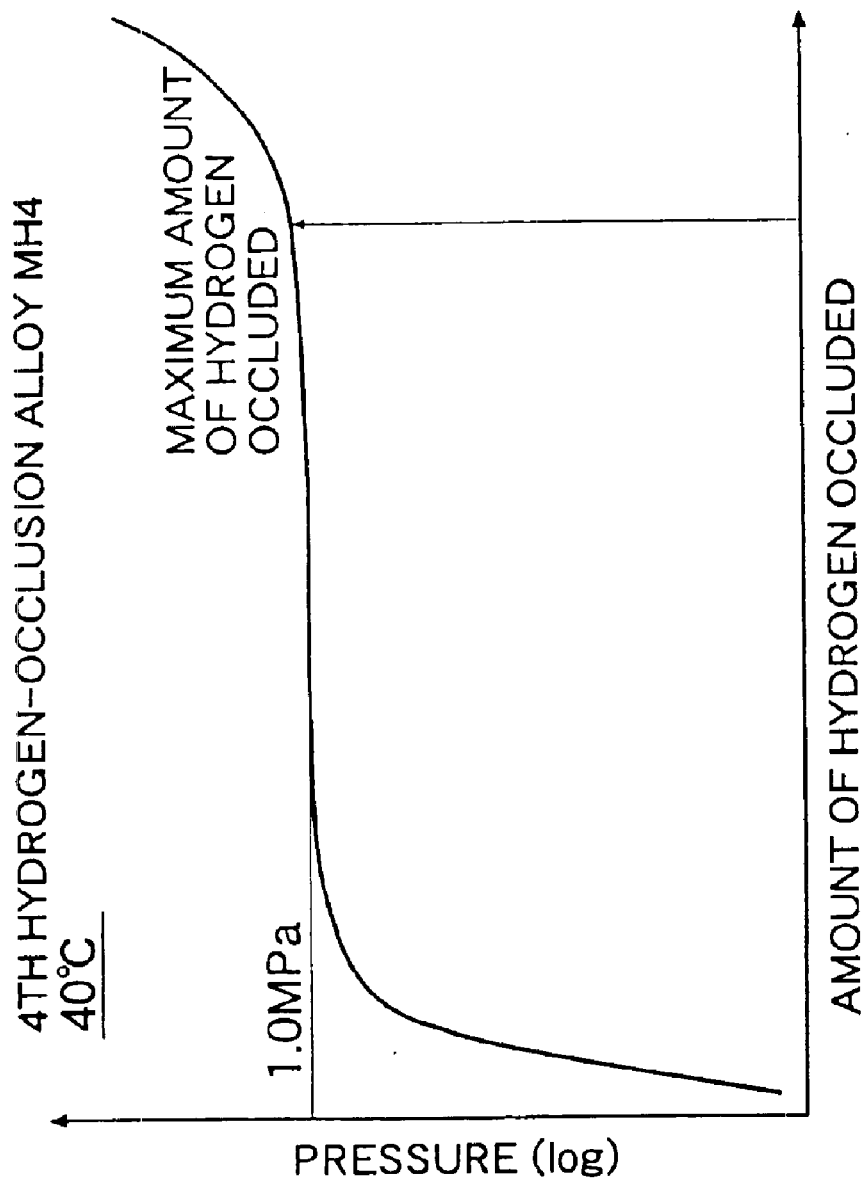
FIG. 12 is a graph showing a PCT curve at 40° for the fourth hydrogen-occlusion alloy.

The third hydrogen-occlusion alloy MH3 is maintained at a temperature of 120° C. for 10 minutes during the regenerating treatment, as in the previously-described embodiment. A PCT curve at 120° C. for the third hydrogen-occlusion alloy MH3 is as shown in FIG. 11. On the other hand, hydrogen released by the regenerating treatment is occluded in the fourth hydrogen-occlusion alloy MH4 at 40° C. under 1 MPa. A PCT curve at 40° C. for the fourth hydrogen-occlusion alloy MH4 is as shown in FIG. 12.

Therefore, the remaining amount of hydrogen occluded in the third hydrogen-occlusion alloy MH3 in the regenerating treatment is set to a value which does not exceed a maximum amount of hydrogen occluded in the fourth hydrogen-occlusion alloy MH4 at 40° C. under 1 MPa.

In the present embodiment, the hydrogen reservoir 61 was filled with 10 kg of a powder of a third hydrogen-occlusion alloy MH3 capable of achieving a maximum amount of hydrogen occluded equal to 1.2% by weight, while the auxiliary hydrogen reservoir 66 was filled with 2 kg of a powder of a fourth hydrogen-occlusion alloy MH4 capable of achieving a maximum amount of hydrogen occluded equal to 1.2% by weight. An average particle size of each of the powders was 15 μm. In this case, the maximum amount of hydrogen occluded in the auxiliary hydrogen reservoir 66 is 0.024 kg [2×0.012], but if it is taken into consideration that about 5% of the maximum amount, i.e., 0.0012 kg [0.024×0.05] is left upon releasing of hydrogen, an amount of hydrogen occluded capable of achieving the regeneration of the third hydrogen-occlusion alloy MH3 is equal to or smaller than 0.0228 kg [0.024–0.0012]. This is equal to 19% [(0.0228/0.12)×100] of the maximum amount of hydrogen occluded in the third hydrogen-occlusion alloy MH3.

In addition, if it is taken into consideration that even if the third hydrogen-occlusion alloy MH3 is heated to 120° C., about 5% of the maximum amount of hydrogen occluded is left, if the regenerating treatment is carried out when the remaining amount of hydrogen occluded in the third hydrogen-occlusion alloy MH3 is equal to or smaller than 24% [19%+5%] of the maximum amount of hydrogen occluded, namely, the defined value, the internal pressure in the hydrogen reservoir 61 can be maintained at 1 MPa or lower, and the amount of hydrogen occluded in the fourth hydrogen-occlusion alloy MH4 cannot exceed the maximum amount of hydrogen occluded at 40° C. under 1 MPa, and in such a state, the regenerating treatment of the third hydrogen-occlusion alloy MH3 can be conducted sufficiently.

Two modes will be described below with reference to FIGS. 9, 13 and 14.

A. Start/Traveling Mode

Figure 13:
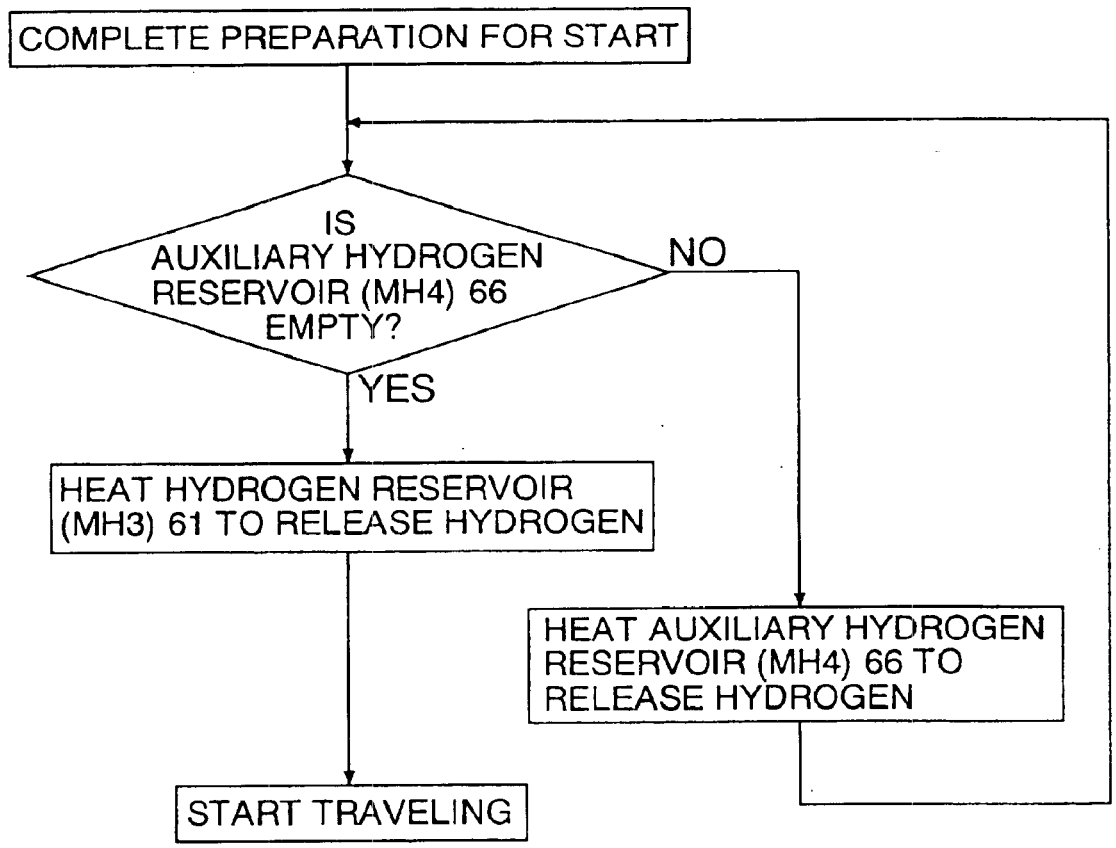
FIG. 13 is a flow chart in a starting/traveling mode.

Referring to FIGS. 9 and 13, a starting preparation such as an operation for turning the starting switch on is carried out.

It is determined whether the auxiliary hydrogen reservoir 66 is empty. The auxiliary hydrogen reservoir 66 is maintained in an empty state during traveling of a vehicle in order to occlude hydrogen released from the hydrogen reservoir 61 during the regenerating treatment. If the auxiliary hydrogen reservoir 66 is not empty, the fourth hydrogen-occlusion alloy MH4 of the auxiliary reservoir 66 is heated by the heating circuit 71 to release hydrogen under such a condition that the first and second two-way valves V1 and V2 are "close" and the third and fourth two-way valves V3 and V4 are "open". Such hydrogen is supplied to the fuel cell 2, where the hydrogen is used as a fuel, thereby starting the operation of the fuel cell 2.

On the other hand, if the auxiliary hydrogen reservoir 66 is empty, the hydrogen reservoir 61 is heated by the heating circuit 70 to release hydrogen, thereby starting the operation of the fuel cell 2 under such a condition that the second and third two-way valves V2 and V3 are "open" and the fourth two-way valve V4 is "close".

If the operation of the fuel cell 2 is brought into its steady state, the traveling of the vehicle is started. The amount of hydrogen released from the hydrogen reservoir 61 is measured by the second flowmeter 65.

B. Recharge/Third Hydrogen-occlusion Alloy Regeneration Mode

Figure 14:
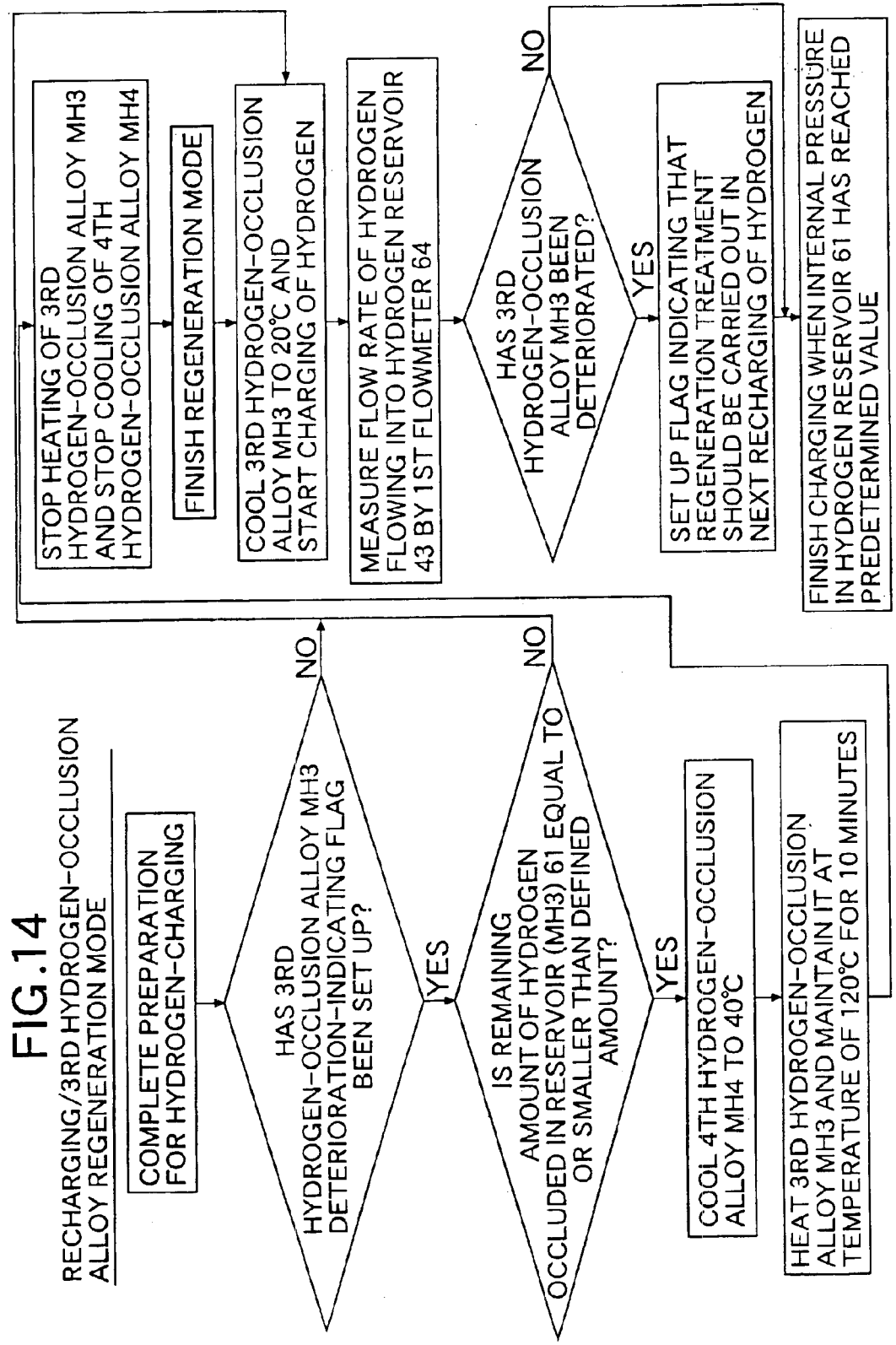
FIG. 14 is a flow chart in a recharge/ third hydrogen-occlusion alloy regeneration mode.

Referring to FIGS. 9 and 14, there is s started a preparation for charging hydrogen into the hydrogen reservoir 61 from the reformer 3 under such a condition that the first two-way valve V1 is "open" and the second to fourth two-way valves V2 to V4 are "close".

It is determined whether the deterioration flag for the third hydrogen-occlusion alloy MH3 has been set up. If the deterioration flag has been not set up, the charging of hydrogen into the hydrogen reservoir 61 is started.

On the other hand, if the deterioration flag has been set up, it is detected by the second flowmeter 65 whether the remaining amount of hydrogen occluded in the hydrogen reservoir 61 is equal to or smaller than the defined value. If the remaining amount of hydrogen occluded exceeds the defined value, the charging of hydrogen into the hydrogen reservoir 61 is started, and the regeneration of the third hydrogen-occlusion alloy MH3 is passed on to the next time.

If the remaining amount of hydrogen occluded in the hydrogen reservoir 61 is equal to or smaller than the defined value, the hydrogen-occlusion alloy MH4 of the auxiliary hydrogen reservoir 66 is cooled to 40° C. by the cooling circuit 75 under such a condition that the first, third and fourth two-way valves V1, V3 and V4 are "close" and the second two-way valve V2 is "open". Then, the fourth two-way valve V4 is opened.

The third hydrogen-occlusion alloy MH3 of the hydrogen reservoir 61 is heated by the heating circuit 70 and maintained at a temperature of 120° C. for 10 minutes. During this time, the regenerating treatment is carried out, and the occlusion of hydrogen released by the fourth hydrogen-occlusion alloy MH4 of the auxiliary hydrogen reservoir 66 is carried out.

The heating of the third hydrogen-occlusion alloy MH3 by the heating circuit 70 is stopped, and the cooling of the fourth hydrogen-occlusion alloy MH4 by the cooling circuit 75 is stopped, and thus, the regeneration mode stops.

The third hydrogen-occlusion alloy MH3 of the hydrogen reservoir 61 is cooled down to 20° C. by the cooling circuit 74 with the first to fourth two-way valves V1 to V4 being "close", and then, the charging of hydrogen is carried out with the first two-way valve V1 being "open".

A flow rate of hydrogen flowing into the hydrogen reservoir 61 is measured by the first flowmeter 64, and it is detected whether the third hydrogen-occlusion alloy MH3 has been deteriorated, based on the reference in FIG. 3. If the third hydrogen-occlusion alloy MH3 has been deteriorated, the flag indicating that the regenerating treatment should be carried out at the next recharging of hydrogen, is set up based on the detection signal from the first flowmeter 64.

After the internal pressure (or the amount of hydrogen flowing into) in the hydrogen reservoir 61 reaches a predetermined value, the first two-way valve V1 is closed to finish the charging.

Figure 15:
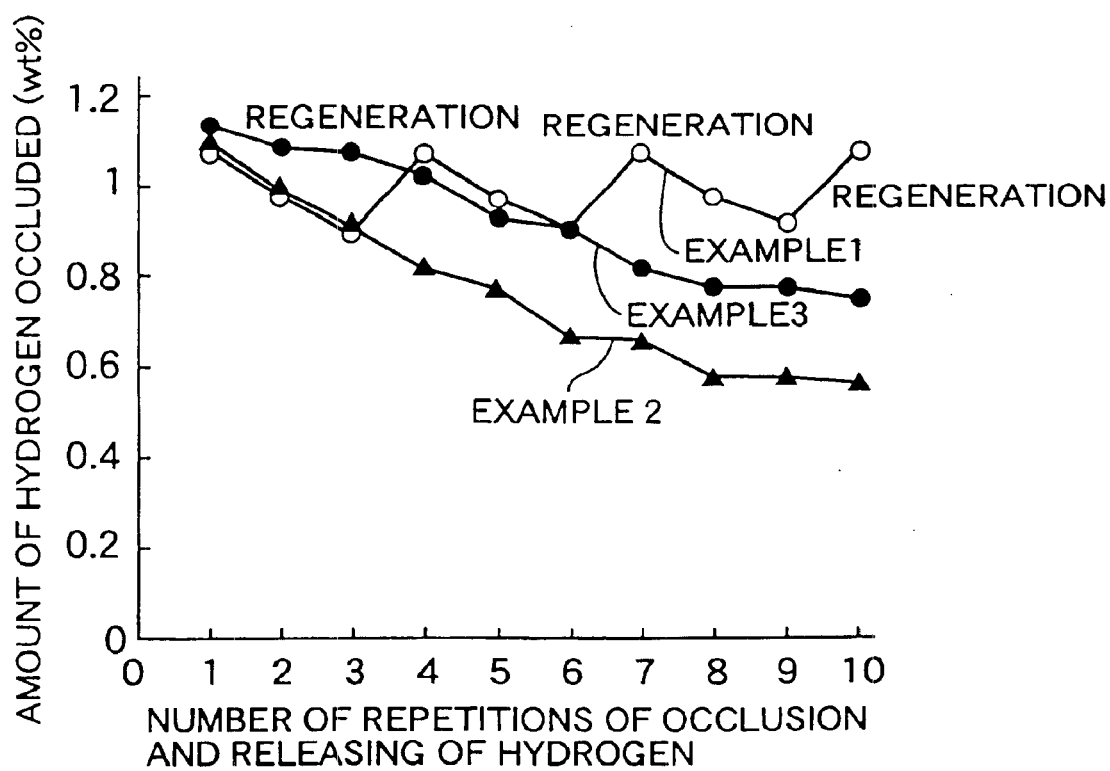
FIG. 15 is a graph showing the relationship between the number of repetitions of occlusion and releasing of hydrogen and the amount of hydrogen-occlusion.

FIG. 15 shows the relationship between the number of repetitions of the occlusion/releasing of hydrogen containing 200 ppm of carbon monoxide (CO) and the amount of hydrogen occluded for examples 1 to 3.

The example 1 pertains to the third hydrogen-occlusion alloy MH3 and corresponds to a case where the regenerating treatment is carried out at 120° C. for 10 minutes, as described above, after a step including the occlusion of hydrogen at 20° C. and the releasing of hydrogen at 60° C. has been carried out three times.

The example 2 pertains to the third hydrogen-occlusion alloy MH3 and corresponds to a case where the hydrogen occlusion temperature and the hydrogen releasing temperature are the same as in the example 1, but the regenerating treatment is not carried out.

The example 3 pertains to an alloy formed by plating the third hydrogen-occlusion alloy MH3 with 2.0% by weight of Pd, and corresponds to a case where the hydrogen occlusion temperature and the hydrogen releasing temperature are the same as in the example 1, but the regenerating treatment has been not carried out.

It can be seen from FIG. 15 that if the examples 1 and 2 are compared with each other, a life-extending effect is provided by carrying out the regenerating treatment. It can be also seen that if the example 3 is excellent in hydrogen occluding characteristic, as compared with the example 2, but its durability decreases with the passage of time, as compared with the example 1 in which the regenerating treatment has been carried out.

As shown in the first and second embodiments, according to the present invention, it is possible to provide a hydrogen-occlusion alloy regenerating apparatus which is capable of extending the life of the hydrogen-occlusion alloy and which is inexpensive. This hydrogen-occlusion alloy regenerating apparatus is suitable for a fuel cell power generating system.

What is claimed is:

1. A hydrogen-occlusion alloy regenerating apparatus comprising a deterioration detecting means for sending a detection signal when a hydrogen-occlusion alloy filled in a hydrogen reservoir and capable of occluding and releasing hydrogen has been deteriorated due to the deposition of impurities, remaining amount detecting means for detecting a remaining amount of hydrogen occluded in the hydrogen-occlusion alloy and for sending a detection signal when an internal pressure of said hydrogen reservoir caused by a released hydrogen corresponding to the hydrogen remaining in the hydrogen-occlusion alloy falls below a predetermined pressure, and heating means for heating the hydrogen-occlusion alloy up to a temperature that is higher than a temperature for normal releasing of the hydrogen, to remove the impurities by the released hydrogen, based on both of the detection signal from the remaining amount detecting means indicative of the internal pressure of the hydrogen reservoir being below said predetermined pressure and the detection signal from the deterioration detecting means indicative of the hydrogen-occlusion alloy having been deteriorated.

2. A hydrogen-occlusion alloy regenerating apparatus according to claim 1, wherein said deterioration detecting means detects an amount of hydrogen occluded in said hydrogen-occlusion alloy, and sends the detection signal if the amount of hydrogen occluded is smaller than an amount of hydrogen occluded when the hydrogen-occlusion alloy is normal.

3. A hydrogen-occlusion alloy regenerating apparatus according to claim 1, wherein said deterioration detecting means detects a rate of occlusion of hydrogen in said hydrogen-occlusion alloy, and sends the detection signal when the hydrogen-occlusion rate is lower than a hydrogen-occlusion rate provided when the hydrogen-occlusion alloy is normal.

4. A hydrogen-occlusion alloy regenerating apparatus for use in a fuel cell power generating system, the fuel cell power generating system including a reformer for producing a reformed gas containing hydrogen from a starting fuel, a fuel cell supplied with said reformed gas, a hydrogen reservoir containing a hydrogen-occlusion alloy capable of occluding and releasing the hydrogen in said reformed gas, and supplying the hydrogen released from said hydrogen-occlusion alloy to said fuel cell, wherein said hydrogen-occlusion alloy regenerating apparatus comprises a deterioration detecting means for sending a detection signal when said hydrogen-occlusion alloy has been deteriorated due to the deposition of impurities in said reformed gas, remaining amount detecting means for detecting a remaining amount of hydrogen occluded in the hydrogen-occlusion alloy and for sending a detection signal when an internal pressure of said hydrogen reservoir caused by the released hydrogen corresponding to the hydrogen remaining in the hydrogen-occlusion alloy falls below a predetermined pressure, and a heating means for heating the hydrogen-occlusion alloy up to a temperature that is higher than a temperature for normal releasing of the hydrogen, to remove the impurities by the released hydrogen, based on both of the detection signal from the remaining amount detecting means indicative of the internal pressure of the hydrogen reservoir being blow said predetermined pressure and the detection signal from the deterioration detecting means indicative of the hydrogen-occlusion alloy having been deteriorated.

5. A method of regenerating a hydrogen-occlusion alloy comprising the steps of: generating a deterioration detection signal when a hydrogen-occlusion alloy filled in a hydrogen reservoir and capable of occluding and releasing hydrogen has been deteriorated due to the deposition of impurities; detecting a remaining amount of hydrogen occluded in the hydrogen-occlusion alloy and generating a remaining amount detection signal when an internal pressure of said hydrogen reservoir caused by a released hydrogen corresponding to the hydrogen remaining in the hydrogen-occlusion alloy falls below a predetermined pressure; and heating the hydrogen-occlusion alloy up to a temperature that is higher than a temperature for normal releasing of the hydrogen, to remove the impurities by the released hydrogen, based on both the deterioration detection signal indicative of the hydrogen-occlusion alloy having been deteriorated and the remaining amount detection signal indicative of the internal pressure of the hydrogen reservoir being below said predetermined pressure.

6. A method of regenerating a hydrogen-occlusion alloy according to claim 5, wherein said deterioration detection signal is generated when an amount of hydrogen occluded in said hydrogen-occlusion alloy is detected to be smaller than an amount of hydrogen occluded when the hydrogen-occlusion alloy is normal.

7. A method of regenerating a hydrogen-occlusion alloy according to claim 5, wherein said deterioration detection signal is generated when a rate of occlusion of hydrogen in said hydrogen-occlusion alloy is detected to be lower than a hydrogen-occlusion rate provided when the hydrogen-occlusion alloy is normal.

8. A method of regenerating a hydrogen-occlusion alloy in a fuel cell power generating system, the fuel cell power generating system including a reformer for producing a reformed gas containing hydrogen from a starting fuel, a fuel cell supplied with said reformed gas, a hydrogen reservoir containing a hydrogen-occlusion alloy capable of occluding and releasing the hydrogen in said reformed gas, and supplying the hydrogen released from said hydrogen-occlusion alloy to said fuel cell, the method comprising the steps of: generating a deterioration detection signal when said hydrogen-occlusion alloy has been deteriorated due to the deposition of impurities in said reformed gas; detecting a remaining amount of hydrogen occluded in the hydrogen-occlusion alloy and generating a remaining amount detection signal when an internal pressure of said hydrogen reservoir caused by the released hydrogen corresponding to the hydrogen remaining in the hydrogen-occlusion alloy falls below a predetermined pressure; and heating the hydrogen-occlusion alloy up to a temperature that is higher than a temperature for normal releasing of the hydrogen, to remove the impurities by the released hydrogen, based on both the deterioration detection signal indicative of the hydrogen-occlusion alloy having been deteriorated and the remaining amount detection signal indicative of the internal pressure of the hydrogen reservoir being below said predetermined pressure.

9. A hydrogen-occlusion alloy regenerating method according to claim 8, wherein the hydrogen released from said hydrogen-occlusion alloy is utilized for operating said fuel cell.

* * * * *